(12) United States Patent
Itaya et al.

(10) Patent No.: US 7,811,619 B2
(45) Date of Patent: Oct. 12, 2010

(54) GREEN TEA BEVERAGE AND METHOD OF MAKING SAME

(75) Inventors: Eri Itaya, Tokyo (JP); Hirokazu Takahashi, Tokyo (JP); Susumu Ohishi, Tokyo (JP); Atsushi Konishi, Tokyo (JP); Yoshikazu Ogura, Tokyo (JP); Kouichi Naitoh, Tokyo (JP)

(73) Assignee: Kao Corporation, Tokyo (JP)

( * ) Notice: Subject to any disclaimer, the term of this patent is extended or adjusted under 35 U.S.C. 154(b) by 1225 days.

(21) Appl. No.: 10/502,649

(22) PCT Filed: Feb. 5, 2003

(86) PCT No.: PCT/JP03/01176

§ 371 (c)(1),
(2), (4) Date: Mar. 8, 2005

(87) PCT Pub. No.: WO03/065817

PCT Pub. Date: Aug. 14, 2003

(65) Prior Publication Data

US 2005/0158437 A1   Jul. 21, 2005

(30) Foreign Application Priority Data

Feb. 5, 2002   (JP) ................ 2002-28658
Apr. 17, 2002  (JP) ................ 2002-114355

(51) Int. Cl.
*A23L 1/22* (2006.01)

(52) U.S. Cl. ..................... 426/597; 426/435

(58) Field of Classification Search ........... 426/597, 426/435
See application file for complete search history.

(56) References Cited

U.S. PATENT DOCUMENTS

| 2,785,979 A | | 3/1957 | Mitchell | |
|---|---|---|---|---|
| 3,821,440 A | * | 6/1974 | Reeve | .......... 426/312 |
| 4,680,193 A | * | 7/1987 | Lunder et al. | .......... 426/597 |
| 6,387,428 B1 | * | 5/2002 | Kinugasa et al. | .......... 426/435 |
| 6,428,818 B1 | * | 8/2002 | Morre et al. | .......... 424/729 |

FOREIGN PATENT DOCUMENTS

| CN | 1033922 A | | 7/1989 |
|---|---|---|---|
| CN | 1098860 A | | 2/1995 |
| GB | 559 758 | | 3/1944 |
| GB | 1 284 721 | | 8/1972 |
| JP | 53-52696 | | 5/1978 |
| JP | 59120050 | | 7/1984 |
| JP | 61-15651 | | 1/1986 |
| JP | 2-57145 | | 2/1990 |
| JP | 3-108444 | | 5/1991 |
| JP | 4-18265 | * | 1/1992 |
| JP | 4-23895 | | 1/1992 |
| JP | 4 271750 | | 9/1992 |
| JP | 6-303904 | | 11/1994 |
| JP | 6 343389 | | 12/1994 |
| JP | 8 103220 | | 4/1996 |
| JP | 11 113491 | | 4/1999 |
| JP | 2000-135059 | | 5/2000 |
| JP | 2000 204370 | | 7/2000 |
| JP | 2003 219799 | | 8/2003 |
| JP | 2003 219800 | | 8/2003 |

OTHER PUBLICATIONS

English translation for 11-113491, published Apr. 1999 from Patent Abstracts of Japan (PAJ). http://www4.ipdl.inpit.go.jp/Tokujitu/PAJdetail.ipdl?N0000=60&N0120=01&N2001=2&N3001=H11-113491.*
U.S. Appl. No. 12/183,675, filed Jul. 31, 2008, Iwasaki, et al.
U.S. Appl. No. 12/183,707, filed Jul. 31, 2008, Iwasaki, et al.

* cited by examiner

*Primary Examiner*—Anthony Weier
(74) *Attorney, Agent, or Firm*—Oblon, Spivak, McClelland, Maier & Neustadt, L.L.P.

(57) ABSTRACT

This invention relates to a process for producing a green tea flavor by extracting it from green tea leaves with water cooler than 10° C., and also to a beverage with the flavor obtained by the process and added therein. This invention also relates to a process for producing a dried green tea polyphenol by subjecting green tea leaves to a first extraction with water cooler than 10° C. and then to a second extraction with warm water of 50° C. or higher, and drying an extract of the second extraction, and also with a process for producing a beverage by adding a green tea polyphenol obtained by the process.

15 Claims, No Drawings

GREEN TEA BEVERAGE AND METHOD OF MAKING SAME

FIELD OF THE INVENTION

This invention relates to a production process of a green tea flavor improved in taste sensation, and also to a beverage with the green tea flavor added therein such that said beverage is enhanced in the sensation of green tea and is imparted with a "refined taste". In addition, this invention is related to a production process of a dried green tea polyphenol, which can reduce a green-tea-derived unpleasant smell and coarse taste generated upon heat sterilization subsequent to its addition to a beverage albeit a polyphenol derived from green tea, and also to a beverage making use of the dried green tea polyphenol.

BACKGROUND OF THE INVENTION

In recent years, many tea-based beverages packaged in cans, PET bottles or the like have been put on the market. These beverages are meant to be thirst-relieving beverages, but also have an aspect of favorite beverages, as compared with beverages prepared by users themselves from tea leaves. The beverages packaged in cans, PET bottles or the like are often very convenient in a sense that they can be readily consumed at any time because they are sterilized beforehand and can be stored over a long term. On the other hand, these packaged beverages are subject to some limitations arisen from their production process, and their taste sensation does not necessarily satisfy consumers' demand.

With respect to beverages with the distinct flavor and taste of green tea such as green tea beverages, there are two directions in designing their flavor and taste: one is beverages with a directionality of enriching catechins, increasing bitterness and hence providing "refreshment", and the other is those with a directionality of inhibiting the dissolution of catechins, reducing bitterness and hence placing an importance on "deliciousness".

In beverages weighing in deliciousness, a "refined taste" inherent in teas extracted at home is not generated sufficiently, because the extract needs to become a relatively dilute composition in order to avoid a smell of heat sterilization. The term "refined taste" used herein is one of the general expressions that describe tastes of green tea, and components that make up a refined taste include amino acids, catechins, purine bases, saccharides, organic acids, minerals, and soon. Such a refined taste is considered to have a relation to the harmony of these components, and among these, amino acids and catechins are considered to have a central role ["Chori Kagaku (Cookery Science)", 25(1), 55, 1992].

Research has been done to develop means that prevent generation of above-described smell of heat sterilization. Those reported include a process which comprises extracting tea leaves with cold water of 20° C. or lower, removing the thus-obtained extract, and then producing a beverage from the tea leaves left as an extraction residue (JP-A-11-113491) and a process which comprises producing a beverage from a residue of tea leaves that has been once subjected to extraction (JP-A-2001-231450).

However, amino acids and the like, which are components associated with the refined taste, are considered to be extractable with tepid water. The above-described processes have both resolved the problem of the generation of a smell of heat sterilization by eliminating portions of the components, which are associated with the refined taste of green tea, by the first extraction. As a result, these processes enable the production of highly-refreshing, tea-based beverages enhanced in bitterness but not beverages having a flavor close to homemade tea excellent in refined taste.

Further, JP-A-2000-50799 discloses an extraction process to obtain a tea having deliciousness and reduced bitterness; namely, tea leaves are immersed in still water maintained at 0 to 36° C. from which dissolved oxygen has been eliminated, and the resulting extract is filtrated. It also discloses a process by which water maintained at 0 to 36° C., from which dissolved oxygen has been eliminated, is constantly supplied into the still water. These processes, however, require an operation for the elimination of dissolved oxygen from water as well as equipment for constantly supplying such water, and therefore, cannot be adopted industrially.

On the other hand, catechins contained in tea are known to have a suppressing effect on an increase in cholesterol level (JP-B-1620943), an inhibitory effect on α-amylase activity (JP-B-3018013), and the like. To obtain such physiological effects of catechins by drinking tea, it is necessary for an adult to drink tea as much as from 4 to 5 cups in a day ["SHOKU-HIN KOGYO (THE FOOD INDUSTRY)", 35(14), 26-30, 1992]. Therefore, a demand has been existed to develop a beverage containing higher concentration of catechins that enables one to take a large amount of catechins in a simpler and easier way.

To add catechins as an active ingredient at high concentration, two methods were contrived. One of these methods is to add pulverized tea leaves (JP-A-10-234301). This method, however, has drawbacks resulting from the addition of tea dust at high concentration, such as an uncomfortable powdery feeling, no good feeling in the throat and a poor aftertaste. Furthermore, in the case of a beverage supplied after its production by way of its distribution, pulverized tea leaves as an active ingredient tend to be precipitated in the bottom of the beverage or are sometimes afloat on the surface of the beverage. In the case of a beverage in a transparent container such as a PET bottle, such a precipitate significantly impairs the commercial value due to its external appearance. The formation of a precipitation may be acceptable in a beverage intended for physiological effects, but operations such as shaking or agitating the beverage become necessary to evenly disperse the pulverized tea leaves upon drinking.

The other method is to add a concentrated tea extract or a concentrate of a commercial tea extract or a purified product thereof (hereinafter referred to as "a catechin preparation"), so that the concentration of catechins in dissolved state increases. When a concentrated tea extract or an unpurified catechin preparation is used, an uncomfortable feeling that could be caused by tea dust or the like upon drinking can be reduced. However, because of an unpleasant smell produced upon its heat sterilization, and the bitterness and astringency of catechins dissolved therein, a beverage with a catechin preparation added abundantly therein becomes excessively unpleasant in its smell and bitter and astringent in its taste. To bring about the physiological effects of catechins, it is necessary to make a beverage suitable for long-term storage or everyday drinking. Nonetheless, the beverages obtained by these means are unable to meet this requirement.

As a method for reducing the generation of an unpleasant smell caused by heat processing, a couple of techniques have been disclosed. JP-A-2001-231450, for example, discloses a process for the production of a canned green tea beverage making use of a green tea extract of the second or subsequent brew from which components with an unpleasant smell are eliminated. The primary purpose of this method is directed at the extraction of catechins from an extract and the reduction of a smell of heat sterilization, so there has been a limitation arising from the defect that the components of the first brew cannot be used. In addition, this process provides no solution to the problem of such excessive bitterness and astringency as in high catechin beverages.

JP-A-11-113491, on the other hand, discloses a technique for reducing a smell of heat sterilization in a production process of a tea beverage such as sencha (middle-grade green tea) or oolong tea. This technique comprises extracting tea leaves with cold water of 20° C. or lower, removing the resultant cold water extract, and then re-extracting the residue with warm water of from 30 to 95° C. However, the problem that the components of the first brew cannot be used has not been solved either in this technique, and also the same problems stated above remain unsolved. In addition, the conditions for the cold water extraction in the first brew are not adequate, thereby raising another problem in that the production of a "coarse taste" in the second brew cannot be inhibited.

Because the components of the first brew cannot be used in these two prior art techniques, there is also a problem that the resulting beverage is a beverage free of so-called delicious components such as amino acids, saccharides and organic acids.

The present invention provides a production process of a green tea flavor for obtaining more authentic packaged tea-based beverages with an importance placed on deliciousness, and a beverage making use of the green tea flavor and reduced in an unpleasant smell and coarse taste while maintaining a refined, strong taste.

The present invention also provides a production process of a dried green tea polyphenol, which can reduce a green-tea-derived unpleasant smell and coarse taste generated upon heat sterilization subsequent to its addition to a beverage albeit a polyphenol derived from green tea, and a production process of a beverage, which makes use of the dried green tea polyphenol.

Further, the present invention provides a beverage which, even when it contains catechins at high concentration, emits no unpleasant smell but retains its original flavor and aroma derived from a green tea extract upon sterilization.

Yet further, the present invention provides an efficient production process of a green tea beverage, which contains catechins at high concentration and is reduced in "the production of an unpleasant smell" upon heat sterilization as well as in "coarse taste", and a green tea beverage obtained as described above.

DISCLOSURE OF THE INVENTION

The present inventors have proceeded with various investigations about extraction methods of green tea leaves. As a result, it has been found that extraction of green tea leaves with water cooler than 10° C. provides a flavor superior in refined taste than does extraction at a higher temperature, and also the addition of the flavor to a beverage can provide a green tea flavor reduced in an unpleasant smell and coarse taste produced upon heating.

It has also been found that a dried green tea polyphenol, which neither produces any unpleasant smell upon heat sterilization nor imparts any green tea flavor when added to a beverage, can be obtained by subjecting green tea leaves to a first extraction with water cooler than 10° C. as described above and then to a second extraction with warm water of 50° C. or higher, and drying an extract of said second extraction.

It has also been found that the addition of a polyphenol solution, which has been obtained by extracting green tea leaves with water cooler than 10° C. and then extracting the residue of the first-mentioned extraction with warm water of 50° C. or higher as described above, to a semi-fermented tea or fermented tea can provide a beverage of a high catechin content with good flavor without generating an unpleasant smell or losing an original aroma upon heat sterilization, yet without imparting a green tea flavor.

It has also been found that a green tea beverage—which is suppressed in the production of an unpleasant smell upon heat sterilization, is reduced in the production of a coarse taste, is reduced in bitterness and astringency specific to catechins and contains catechins at high concentration—can be obtained by firstly extracting green tea leaves with cold water lower than 10° C. and extracting the residue of the first-mentioned extraction with warm water of 50° C. or higher as described above, and mixing the extracts of above two operations, and then applying heat sterilization.

The present invention provides a production process of a green tea flavor, which comprises extracting green tea leaves with water cooler than 10° C.; and also a beverage with a green tea flavor obtained by the production process added therein.

The present invention also provides a production process of a dried green tea polyphenol, which comprises subjecting green tea leaves to a first extraction with water cooler than 10° C. and then to a second extraction with warm water of 50° C. or higher, and drying an extract of the second extraction.

The present invention further provides a beverage with the dried green tea polyphenol added therein.

The present invention still further provides a beverage with the following ingredients (A) and (B) added therein:

(A) a polyphenol solution obtained by extracting green tea leaves with water cooler than 10° C. and then extracting a residue of the first-mentioned extraction with warm water of 50° C. or higher, and (B) a semi-fermented tea extract or fermented tea extract.

The present invention yet further provides a production process of a green tea beverage, which comprises extracting green tea leaves with water cooler than 10° C. (first extraction), extracting a residue of the first extraction with warm water of 50° C. or higher (second extraction), mixing an extract (a) obtained by the first extraction and an extract (b) obtained by the second extraction, and then applying sterilization processing; and also a green tea beverage obtained by the production process.

DETAILED DESCRIPTION OF THE INVENTION

Examples of the green tea leaves for use in the present invention include sencha (middle-grade green tea), bancha (coarse green tea), gyokuro (shaded green tea), tencha (powdered tea), kamairicha (roasted tea) and the like, which have been prepared from tea leaves of the Genus *Camellia*, for example, *C. sinensis, C. assamica* and the Yabukita variety or their hybrids.

In the production process of a green tea flavor of the present invention, extraction (the first extraction) from green tea leaves is carried out with cold water lower than 10° C. Extraction with water at 10° C. or higher results in strong bitterness, so that no satisfactory refined taste can be obtained. Further, a beverage, in which a solution extracted with water at 10° C. or higher has been added, loses an original aroma and produces an unpleasant smell as well as a coarse taste upon sterilization. The temperature of water may be preferably from −5 to 9° C., more preferably from −5 to 8° C., even more preferably from −5 to 5° C. An unduly low water temperature is not preferred because freezing is hardly avoided and the energy consumption becomes large.

The amount of the water for use in the first extraction may preferably be from 5 to 40 times by weight, more preferably from 5 to 25 times by weight as much as the green tea leaves. The extraction time may be preferably from 1 to 120 minutes or so, more preferably from 1 to 100 minutes, even more preferably from 1 to 80 minutes, depending upon the method of extraction and the scale upon conducting the extraction. The water to be used may be any water such as tap water, distilled water or deionized water, although deionized water is preferred from the standpoint of taste.

The first extraction can be carried out by a conventional method such as stirring extraction, countercurrent extraction or teabag-like extraction. It is efficient to carry out a method in which tea leaves are filled in a column, through which cold water is passed, when multiple extractions are to be performed. Before extraction, an antioxidant such as sodium ascorbate, a pH regulator such as an organic acid or organic acid salt, an inorganic salt capable of showing a freezing point depressing effect and a polyol can be incorporated into water prior to extraction. Further, the extraction can be carried out under a so-called non-oxidizing atmosphere while removing dissolved oxygen through degasification by boiling, or aeration by inert gas such as nitrogen gas. The pH of the extract is preferably from 3 to 7, more preferably from 4 to 7 from the viewpoint of the extraction efficiency of the flavor.

The green tea flavor (extract (a)) obtained by the process of the present invention can be used for the production of a beverage either as is or after being purified through a membrane or the like. As an alternative, it can be added to a beverage or the like after being concentrated through a membrane or the like, and subjected to sterilization and storage thereafter.

The flavor obtained by the process of the present invention contains catechins. The term "catechins" used herein is a generic term, which collectively encompasses non-epicatechins such as catechin, gallocatechin, catechingallate and gallocatechin gallate, and epicatechins such as epicatechin, epigallocatechin, epicatechin gallate, epigallocatechin gallate. The term "total amount of catechins in tea leaves" used herein means the amount of catechins as detected by HPLC after extracting the tea leaves with a 100-fold excess of boiling water for 10 minutes under sufficient stirring and then removing the tea leaves.

The extraction percentage of catechins from the tea leaves in the first extraction may be preferably from 2 to 20 wt. %, more preferably from 2 to 16 wt. %, even more preferably from 2 to 12 wt. % based on the total amount of catechins in the tea leaves from the standpoint of the efficiency of production and the flavor of the extract. The content of gallate esters (the gallates percentage) in the total catechins extracted concurrently with the extraction of the green tea flavor may be preferably 32 wt. % or lower, more preferably 31.5 wt. % or lower, even more preferably 31 wt. % or lower, still more preferably 30 wt. % from the standpoints of physiological effects and prevention of bitterness. The term "gallates percentage" means a value obtained by dividing the total amount of catechingallate, gallocatechin gallate, epicatechin gallate and epigallocatechin gallate by the total amount of the above-described eight types of catechins.

A beverage imparted with the refined taste specific to green tea can be obtained by adding the green tea flavor obtained by the first extraction of the present invention. As the beverage, a packaged beverage having the flavor of green tea is preferred.

The residual green tea leaves obtained after the first extraction is separated from the extract of the first extraction, and is provided for the subsequent extraction of green tea polyphenol (second extraction).

From the tea leaves that have been subjected to the first extraction, green tea polyphenol can be obtained by carrying out the second extraction with warm water of 50° C. or higher. The efficiency of extraction of catechins is not sufficient if the second extraction is carried out with warm water lower than 50° C., and the extraction of green tea polyphenol which is useful for the preparation of a beverage intended to bring about various physiological effects of catechins becomes difficult.

It is to be noted that the principal components extracted in the second extraction are catechins, and it is preferred to choose a second extraction temperature in accordance with the desired composition of catechins. From the standpoint of the efficiency of extraction, extraction at 60 to 100° C. is preferred, with 70 to 100° C. being more preferred.

The amount of water for use in the second extraction may preferably be from 5 to 40 times by weight, more preferably from 5 to 25 times by weight the dry weight of the residual tea leaves after the first extraction. With a view on suppressing a coarse taste or the like generated as a result of a high-temperature extraction, the second extraction time may be preferably from 1 to 60 minutes, more preferably from 1 to 40 minutes, even more preferably from 1 to 30 minutes depending upon the manner of extraction and the scale of equipment. For the second extraction, the same method as in the first extraction can be adopted.

The green tea polyphenol obtained by the second extraction may contain non-polymer catechins preferably at from 0.01 to 4 wt. %, more preferably at from 0.01 to 2 wt. %, even more preferably at from 0.1 to 2 wt. % immediately after the extraction.

The green tea polyphenol obtained by the second extraction is dried either as is or after being subjected to purification such as filtration. The drying method can be either spray drying or freeze drying. Freeze drying is more preferred from the standpoint of avoiding modifications of active components on account of a smaller heat load applied on the dried green tea polyphenol.

The content of gallate esters (the gallates percentage) in the non-polymer catechins in the thus-obtained, dried green tea polyphenol may be preferably from 45 to 65 wt. %, more preferably from 45 to 60 wt. %, even more preferably from 45 to 57 wt. % from the standpoint of taste and physiological effects.

Addition of the dried green tea polyphenol obtained by the process of the present invention enables to produce a variety of beverages containing catechins that is expected to bring the physiological effects of catechins.

The polyphenol solution (A) obtained from the second extract can be used for the production of a beverage either as is or after subjected to purification such as filtration. As an alternative, it can be provided for addition to a beverage or the like after it is subjected to spray drying, freeze drying, concentration by means of membrane concentration or the like or sterilization.

When an extract of semi-fermented tea or fermented tea is added to the polyphenol solution (A), a beverage of high catechin content with good flavor can be obtained without generating an unpleasant smell or losing an original aroma upon heat sterilization, yet without imparting a green tea flavor.

As the semi-fermented tea extract or fermented tea extract (B) for use in the present invention, oolong tea, black tea, Pu erh tea or the like is preferred, with oolong tea or black tea being more preferred.

Increases in bitterness and astringency owing to high concentration of catechins in the polyphenol solution (A) are compatible with the flavor of a semi-fermented teat or fermented tea, thereby making it possible to produce a beverage which enables one's easy intake of a great deal of catechins; namely, the addition of the polyphenol solution (A) enables to reduce the production of an unpleasant smell upon heating, and moreover, to produce a variety of beverages of high catechin content enhanced in the sensation of oolong tea or the sensation of black tea, in a case where oolong tea or black tea is chosen for the semi-fermented tea extract or fermented tea extract (B).

By the addition of the polyphenol (A), the beverage according to the present invention may contain catechins, which are non-polymers and are in a dissolved form in water, at a concentration of preferably from 0.092 to 0.5 wt. %, more preferably from 0.1 to 0.4 wt. %, even more preferably from 0.1 to 0.3 wt. %, still more preferably from 0.14 to 0.3 wt. %. When catechins are contained in this range, a great deal of catechins can be easily taken not only in view of the taste but also in view of the amount of the beverage to be taken. Further, the content of the gallate esters of catechins (the gallates percentage) in the non-polymer catechins contained in the beverage of the present invention may be preferably from 45 to 65 wt. %, more preferably from 45 to 60 wt. %, even more preferably from 45 to 57 wt. % from the standpoint of physiological effects and prevention of bitterness.

In addition, a green tea beverage is obtained by mixing the first extract (a) with the second extract (b) and then subjecting the resultant mixture to heat sterilization. The green tea obtained by this way is suppressed in the generation of an unpleasant smell and a coarse taste upon heat sterilization, is reduced in the bitterness and astringency specific to catechins, yet contains catechins at high concentration.

The mixing ratio of the first extract to the second extract can be determined depending on the physiological effects and taste expected for the beverage, however, from the standpoint of assurance of the concentration of catechins in the green tea beverage and maintenance of the flavor of green tea, the mixing weight ratio (a/b) of the first extract (a) to the second extract (b) may be preferably from 4/1 to 1/6, more preferably from 3/1 to 1/5, even more preferably from 2/1 to 1/3.

The mixture is then subjected to sterilization. The sterilization can be heat sterilization, which may be conducted ether after or before filling the mixture in a container or the like. More specifically, the sterilization can be carried out, for example, by filling the mixture in a container such as a metal can and, when heat sterilization is feasible, applying heat sterilization under sterilization conditions as prescribed in the Food Sanitation Act. For those which cannot be subjected to retort sterilization like PET bottles or paper containers, a process is adopted such that the mixture is sterilized beforehand under similar sterilization conditions as those described above, for example, at a high temperature for a short time by a plate-type heat exchanger or the like, is then chilled to a certain temperature, and is then filled in a container. It is also possible to conduct an operation such that subsequent to heat sterilization under acidic conditions, the pH of the mixture is restored to neutral under aseptic conditions or that subsequent to heat sterilization under neutral conditions, the pH of the mixture is restored to acidic under aseptic conditions.

The present invention enables to produce a beverage, of high catechin content which is weak in a coarse taste, is reduced in bitterness, and is suppressed in the generation of an unpleasant smell upon heat sterilization. The green tea beverage according to the present invention contains catechins, which are non-polymers and are in a dissolved form in water, preferably at from 0.092 to 0.5 wt. %, more preferably at from 0.1 to 0.4 wt. %, even more preferably at from 0.1 to 0.3 wt. %, still more preferably at from 0.14 to 0.3 wt. %. When the concentration of catechins falls within this range, a great deal of catechins can be taken with ease, and when produced by the production process of the present invention, strong bitterness and a stringency and strong puckeriness are reduced. In addition, the generation of an unpleasant smell after heat sterilization can also be reduced. From the standpoints of physiological effects and prevention of bitterness, the gallate esters of catechins may account preferably for from 45 to 65 wt. %, more preferably for from 45 to 60 wt. %, even more preferably for from 45 to 57 wt. % of such non-polymer catechins. The term "the content of gallate esters of catechins (the gallate percentage)" as used herein means a value obtained by dividing the total amount of catechin gallate, gallocatechin gallate, epicatechin gallate and epigallocatechin gallate by the total amount of the above-described eight types of catechins.

To the above-described beverage according to the present invention, it is possible to further incorporate additives such as antioxidants, perfumes, various esters, organic acids, organic acid salts, inorganic acids, inorganic salts, colorants, emulsifiers, preservatives, seasoning agents, sweeteners, bitterness regulators, sour seasonings, pH regulators and quality stabilizers either singly or in combination.

Examples of the sweeteners include sugar, glucose, fructose, isomerized syrup, glycyrrhizin, stevia, aspartame, sucralose, fructooligosaccharide, and galactooligosaccharide. Examples of the bitterness regulators include cyclic dextrins led by cyclodextrin. Examples of the cyclic dextrins include $\alpha$-, $\beta$-and $\gamma$-cyclodextrins as well as branched $\alpha$-, $\beta$- and $\gamma$-cyclodextrins. These cyclic dextrins can be contained in the beverages of present invention preferably at from 0.05 to 0.5 wt. %, more preferably at from 0.05 to 0.4 wt. %. Examples of the sour seasonings include, in addition to fruit juices and the like extracted from natural sources, citric acid, tartaric acid, malic acid, lactic acid, fumaric acid, and phosphoric acid. Examples of the inorganic acids and inorganic acid salts include phosphoric acid, disodium phosphate, sodium metaphosphate, and sodium polyphosphate, and examples of the organic acids and organic acid salts include citric acid, succinic acid, itaconic acid, malic acid and sodium citrate.

To the beverage according to the present invention, ascorbic acid or a salt thereof can also be added as an antioxidant either in the extraction step or after the extraction. The concentration of ascorbic acid or the salt thereof in the beverage may be preferably from 0.01 to 0.2 wt. %, more preferably from 0.02 to 0.15 wt. %, even more preferably from 0.03 to 0.1 wt. % from the standpoint of antioxidant effect and taste.

The beverage according to the present invention can preferably be provided in the form of a packaged beverage, and containers to be used for such packages include molded containers made of polyethylene terephthalate as a principal component (so-called PET bottles), metal cans, paper containers combined with metal foils or plastic films, and bottles. The term "packaged beverage" as used herein means a beverage which can be drunken without dilution.

EXAMPLES

Measurement of Catechins

A high-performance liquid chromatograph (model: SCL-10AVP) manufactured by Shimadzu Corporation was used. The chromatograph was fitted with a column packed with octadecyl-introduced silica gel designed for liquid chromatograph, "L-Column, TM ODS" (4.6 mm in diameter×250 mm in length; product of Chemicals Evaluation and Research Institute, Japan). A beverage, which had been filtrated through a filter (0.8 μm), was subjected to chromatography at a column temperature of 35° C. by gradient elution. A 0.1 mol/L solution of acetic acid in distilled water and a 0.1 mol/L solution of acetic acid in acetonitrile were fed as a mobile phase solution A and mobile phase solution B, respectively. The sample injection quantity was set at 20 μL and 280 nm UV detector wavelength was set at 280 nm.

Example 1

Sencha leaves (100 g) were filled in an extraction column of 7 cm inner diameter and 40 cm height, extraction was carried out by recirculating cold water of 0° C. (1,500 mL) by a pump at 500 mL per minute for 10 minutes. An extract (1,301 mL) was obtained as a flavor solution, in which the concentration of catechins was 108 mg/100 mL.

Sencha leaves (66.6 g) were added to warm water of 65° C. (2,000 mL), and extraction was carried out for 5 minutes while stirring. The extract was chilled with ice and filtrated through two sheets of No. 2 filter paper. An extract (1,718 g) was obtained as a "green tea extract 1", in which concentration of catechins was 255 mg/100 mL.

The total amount of catechins in the Sencha leaves used as described above was 141 mg per gram of the tea leaves.

Deionized water (300 g) was added to the green tea extract 1 (200 g), the flavor solution (200 g) and ascorbic acid (0.4 g). The PH of resultant solution was adjusted to 6.2 with a 5% aqueous solution of sodium bicarbonate, followed by the addition of deionized water to give a total amount of 800 g. The thus-obtained solution was filled in cans, and sterilized at 121° C. for 20 minutes to obtain a beverage of Example 1. The concentration of catechins in the beverage was 84 mg/100 mL.

Examples 2 & 3

In accordance with Table 1, beverages of Examples 2 and 3 were obtained in a similar manner as in Example 1 except flavor solutions obtained at 5° C. and 8° C. were used, respectively.

Comparative Examples 1, 2 & 3

In accordance with Table 1, a beverage of Comparative Example 1 and beverages of Comparative Examples 2 and 3, which used flavor solutions extracted at 15° C. and 40° C., respectively, in a similar manner as in Example 1, were obtained.

Comparative Example 4

Sencha leaves (66.6 g) were added to warm water of 55° C. (2,000 mL), extraction was carried out for 5 minutes while stirring. The extract was chilled with ice and filtrated through two sheets of No. 2 filter paper. An extract (1,722 g) was obtained as a "green tea extract 2", in which the concentration of catechins was 189 mg/100 mL. Using the green tea extract 2, a beverage of Comparative Example 4 was prepared in accordance with Table 1 in a similar manner as in Example 1.

Organoleptic Evaluation

Evaluation of the beverages of the present invention (Examples 1, 2 and 3) and the comparative beverages (Comparative Examples 1, 2, 3 and 4) was performed by three panelists expert on flavors and tastes. Evaluation criteria included the strength of a smell of heat sterilization, the strength of a refined taste of green tea, the strength of bitterness, and the strength of a coarse taste. The ranking results are presented in Table 1.

The beverages of Examples 1, 2 and 3 were recognized to be rich in the aroma of green tea and also to have a strong, refined taste. Further, they did not have a coarse taste much, were reduced in the generation of an unpleasant smell caused by heat sterilization, and had an adequate level of bitterness. They did not have such astringency as remaining on the tongue after drinking. The beverage of Comparative Example 1 had a weak smell of heat sterilization and had an adequate level of bitterness, but it had a weakly refined taste of green tea and gave some sensation of a coarse taste.

The beverage of Comparative Example 2 had an adequate level of bitterness, but it was weak in aroma and had a smell of heat sterilization although it was weaker. The refined taste of green tea was weaker as a result of the production of a coarse taste and a stringency. The beverage of Comparative Example 3 was more deprived of an aroma, and had a stronger smell of heat sterilization. The remaining coarse taste and astringency were very weak. The beverage of Comparative Example 4 was felt to have a relatively strong, refined taste of green tea, and the remaining astringency and coarse taste were also felt strong. However, it had a weak aroma of green tea and a strong smell of heat sterilization.

TABLE 1

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Flavor extraction | Tea leaves (g) | 100 | 100 | 100 |  | 100 | 100 |  |
|  | Deionized water (g) | 1500 | 1500 | 1500 |  | 1500 | 1500 |  |
|  | Temperature (° C.) | 0 | 5 | 8 |  | 15 | 40 |  |
|  | Extraction time (min) | 10 | 10 | 10 |  | 10 | 10 |  |
|  | Amount of recovered flavor solution (g) | 1301 | 1282 | 1279 |  | 1259 | 1204 |  |
| Catechins in flavor solution | Conc. of catechins (wt. %) | 0.108 | 0.128 | 0.149 |  | 0.188 | 0.339 |  |
|  | Gallates percentage (%) | 29 | 30 | 31 |  | 33 | 42 |  |
|  | Recovery rate of catechins (%) | 11.6 | 13.7 | 16.0 |  | 20.2 | 36.3 |  |
| Evaluation of flavor solution* | Refined taste | Strong | Strong | Strong | — | Rel. weak | Weak | — |
|  | Bitterness | Adequate | Adequate | Adequate | — | Rel. strong | Strong | — |
|  | Coarse taste | Weak | Weak | Weak | — | Rel. strong | Strong | — |

TABLE 1-continued

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Beverage formulation | Green tea extract 1 | 200 | 200 | 200 | 200 | 200 | 200 |  |
|  | Green tea extract 2 |  |  |  |  |  |  | 400 |
|  | Flavor solution (g) | 200 | 200 | 200 |  | 200 | 200 |  |
|  | Sodium ascorbate (g) | 0.4 | 0.4 | 0.4 | 0.4 | 0.4 | 0.4 | 0.4 |
|  | 5% Na bicarbonate soln. (g) | q.s. | q.s. | q.s. | q.s. | q.s. | q.s. | q.s. |
|  | Deionized water | Balance | Balance | Balance | Balance | Balance | Balance | Balance |
|  | Total amount (g) | 800 | 800 | 800 | 800 | 800 | 800 | 800 |
| Analytical data | Conc. of catechins (wt. %) | 0.084 | 0.087 | 0.092 | 0.059 | 0.100 | 0.137 | 0.085 |
|  | Gallates percentage (%) | 45 | 45 | 44 | 52 | 44 | 46 | 47 |
| Evaluation | Smell of heat sterilization | Weak | Weak | Weak | Weak | Rel. strong | Strong | Strong |
|  | Refined taste | Strong | Strong | Strong | Weak | Rel. weak | Weak | Rel. weak |
|  | Bitterness | Adequate | Adequate | Adequate | Adequate | Rel. strong | Strong | Adequate |
|  | Coarse taste | Weak | Weak | Weak | Rel. strong | Rel. strong | Strong | Strong |

Note)
Each flavor (200 g) was diluted with water to give a solution (800 g). Evaluation of the solution was performed in a similar manner as beverages.

Example 4

Green tea leaves (100 g) were filled in an extraction column of 7 cm inner diameter and 40 cm height, and the first extraction of the tea leaves was carried out by recirculating cold water of 0° C. (1,500 mL) by a pump at 500 mL per minute for 10 minutes. Subsequent to removal of the recirculated solution, the second extraction was carried out by recirculating warm water of 70° C. (1,500 mL) at 500 mL per minute for 20 minutes. After the second extraction, an extract (1,357 mL) was recovered and then promptly chilled with ice water to give a green tea polyphenol solution. The thus-obtained green tea polyphenol solution was freeze-dried under the below-described conditions to obtain a dried green tea polyphenol: the sample was cooled to −40° C. to freeze, and the frozen sample was gradually heated in a vacuum level of 0.2 Torr from −40° C. to 20° C. over 12 hours, and was then held at 20° C. for 12 hours. The concentration of catechins in the dried green tea polyphenol was 35.6 wt. %, the gallates percentage was 55.8 wt. %, and the caffeine concentration was 8.4 wt. %.

Example 5

A dried green tea polyphenol was obtained in a similar manner as in Example 4 except that the first extraction temperature and the second extraction temperature were set at 5° C. and 85° C., respectively, as presented in Table 2.

Example 6

A dried green tea polyphenol was obtained in a similar manner as in Example 4 except that the first extraction temperature and second extraction temperature were set at 8° C. and 95° C., respectively, as presented in Table 2.

Comparative Example 5

A dried green tea polyphenol was obtained in a similar manner as in Example 4 except that, as presented in Table 2, the first extraction was skipped and the second extraction was carried out under the condition of 70° C.

Comparative Example 6

A dried green tea polyphenol was obtained in a similar manner as in Example 4 except that the first extraction temperature and second extraction temperature were set at 15° C. and 85° C., respectively, as presented in Table 2.

Comparative Example 7

A dried green tea polyphenol was obtained in a similar manner as in Example 4 except that the first extraction temperature and second extraction temperature were set at 40° C. and 85° C., respectively, as presented in Table 2.

Comparative Example 8

A dried green tea polyphenol was obtained in a similar manner as in Example 4 except that the first extraction temperature, the first extraction time and the second extraction temperature were set at 70° C., 5 minutes and 95° C., respectively, as presented in Table 2.

Comparative Example 9

As presented in Table 2, a pre-drying second extract which had been obtained in a similar manner as in Example 6 was subjected to drying in a laboratory spray drier "GA-32" (manufactured by Yamato Scientific Co., Ltd.) at an inlet temperature of 180° C. while controlling the drier such that the temperature of the product would remain within from 70 to 80° C. and would not exceed 80° C.

Organoleptic Evaluation of Dried Green Tea Polyphenols

Evaluation of the dried green tea polyphenols according to the present invention was performed by three panelists expert on flavors and tastes. As an evaluation method, each of the dried green tea polyphenol (3.9 g) obtained in Examples 4, 5 and 6 and Comparative Examples 5, 6, 7, 8 and 9, plus β-cyclodextrin (2.88 g), sodium ascorbate (0.8 g) and a 5% aqueous solution of sodium bicarbonate (q.s.) were dissolved in deionized water to give a total amount of 800 g while controlling the pH to 6.2. The resulting solution was filled in cans, followed by heat sterilization at 121° C. for 20 minutes. Evaluation criteria included the strength of a smell of heat sterilization and the strength of a coarse taste in the aqueous solution of the dried green tea polyphenol. The results of the evaluation are presented in Table 2.

With each of the aqueous solutions of the dried green tea polyphenols of Examples 4 to 6, no smell of heat sterilization was felt. Each of those aqueous solutions was free of any coarse taste derived from the dried green tea polyphenol, and had a clear taste.

The aqueous solution of the dried green tea polyphenol of Comparative Example 5 had a strong smell of sterilization as well as strong bitterness and coarse taste. The aqueous solution of the dried green tea polyphenol of Comparative Example 6 had a strong smell of heat sterilization and a slight coarse taste. The aqueous solution of the dried green tea polyphenol of Comparative Example 7 had a strong bitterness and a smell of heat sterilization as well as a distinct coarse taste. With the aqueous solution of the dried green tea polyphenol of Comparative Example 8, a smell of heat sterilization and a coarse taste were distinctly recognized. Bitterness associated with a tang, which had been derived from the green tea, was also felt as an aftertaste. In Comparative Example 9, the second extraction was carried out under similar conditions as in Example 6; nonetheless, a coarse taste was recognized on the aqueous solution of the dried green tea polyphenol of Comparative Example 9, presumably for the difference in the drying conditions.

tion was carried out for 5 minutes while stirring. The extract was chilled with ice water and filtrated through two sheets of No. 2 filter paper. An extract (2,628 g) was obtained as an "oolong tea extract".

The oolong tea extract (210 g), the dried green tea polyphenol (3.4 g), β-cyclodextrin (2.88 g) and ascorbic acid (0.8 g) were combined together, and the pH of the resultant mixture was adjusted to 6.2 with a 5% aqueous solution of sodium bicarbonate, and then, deionized water was added to give a total amount of 800 g. The resulting aqueous solution was filled in cans, followed by the heat sterilization at 121° C. for 20 minutes to obtain a beverage of Example 8.

[Results of Organoleptic Evaluation of the Black Tea Beverage and Oolong Tea Beverage]

Evaluation of the beverages of the present invention with the dried green tea polyphenol added therein was performed by three panelists expert on flavors and tastes.

TABLE 2

|  |  | Ex. 4 | Ex. 5 | Ex. 6 | Comp. Ex. 5 | Comp. Ex. 6 | Comp. Ex. 7 | Comp. Ex. 8 | Comp. Ex. 9 |
|---|---|---|---|---|---|---|---|---|---|
| First extraction | Tea leaves (g) | 100 | 100 | 100 | 100 | 100 | 100 | 100 | 100 |
|  | Deionized water (g) | 1500 | 1500 | 1500 |  | 1500 | 1500 | 1500 | 1500 |
|  | Temperature (° C.) | 0 | 5 | 8 |  | 15 | 40 | 70 | 8 |
|  | Extraction time (min) | 10 | 10 | 10 |  | 10 | 10 | 5 | 10 |
|  | Recovered amount (g) | 1301 | 1282 | 1279 |  | 1259 | 1204 | 1191 | 1275 |
|  | Conc. of catechins (wt. %) | 0.108 | 0.128 | 0.149 |  | 0.188 | 0.339 | 0.396 | 0.148 |
|  | Gallates percentage (%) | 29 | 30 | 31 |  | 33 | 42 | 50 | 30 |
| Second extraction | Deionized water (g) | 1500 | 1500 | 1500 | 1500 | 1500 | 1500 | 1500 | 1500 |
|  | Temperature (° C.) | 70 | 85 | 95 | 70 | 85 | 85 | 95 | 95 |
|  | Extraction time (min) | 20 | 20 | 20 | 10 | 20 | 20 | 20 | 20 |
|  | Recovered amount (g) | 1357 | 1341 | 1339 | 1188 | 1380 | 1420 | 1404 | 1345 |
|  | Conc. of catechins (wt. %) | 0.474 | 0.514 | 0.543 | 0.561 | 0.484 | 0.390 | 0.403 | 0.540 |
| Analytical data of dried product | Conc. of catechins (wt. %) | 35.6 | 37.5 | 39.1 | 28.9 | 38.6 | 39.8 | 36.6 | 38.8 |
|  | Gallates percentage (wt. %) | 55.8 | 59.9 | 62.4 | 52.5 | 61.4 | 64.5 | 63.0 | 63.1 |
|  | Conc. of caffeine (wt. %) | 8.4 | 8.5 | 8.5 | 7.0 | 8.6 | 8.5 | 7.0 | 8.6 |
| Evaluation | Smell of heat sterilization | None | None | None | Strong | Strong | Strong | Strong | None |
|  | Coarse taste | None | None | None | Strong | Rel. strong | strong | Strong | Weak but felt |

Example 7

Using the dried green tea polyphenol obtained in Example 5, a sugarless black tea beverage was prepared in a manner to be described hereinafter.

Black tea leaves (Darjeeling) (100 g) were added to warm water of 60° C. (3,000 mL), and extraction was carried out for 3 minutes while stirring. The extract was chilled with ice and filtrated through two sheets of No. 2 filter paper. An extract (2,635 g) was obtained as a "black tea extract".

The black tea extract (210 g), the dried green tea polyphenol (Example 5) (3.8 g), β-cyclodextrin (2.88 g) and ascorbic acid (0.8 g) were combined together, and the pH of the resultant mixture was adjusted to 6.2 with a 5% aqueous solution of sodium bicarbonate, and then, deionized water was added to give a total amount of 800 g. The resulting aqueous solution was filled in cans, followed by heat sterilization at 121° C. for 20 minutes to obtain a beverage of Example 7.

Example 8

Using the dried green tea polyphenol obtained in Example 4, an oolong tea beverage was prepared in a manner to be described hereinafter.

Oolong tea leaves (blend of different varieties) (100 g) were added to warm water of 90° C. (3,000 mL), and extrac- The beverages of Examples 7 and 8 were both good in the sensation of black tea and the sensation of oolong tea, respectively, and rich in aroma. They had an adequate level of bitterness, and no flavor of green tea was recognized. Further, neither a smell of heat sterilization nor a coarse taste was felt.

TABLE 3

|  |  |  | Ex. 7 | Ex. 8 |
|---|---|---|---|---|
| Formulation | Black tea extract | g | 210.4 |  |
|  | Oolong tea extract | g |  | 210.4 |
|  | Dried green tea polyphenol | g | 3.8 | 3.4 |
|  | β- Cyclodextrin | g | 2.88 | 2.88 |
|  | Sodium ascorbate | G | 0.8 | 0.8 |
|  | 5% Aqueous solution of sodium ascorbate | g | q.s. | q.s. |
|  | Deionized water | g | Balance | Balance |
|  | Total amount | g | 800 | 800 |
| Evaluation | Aroma |  | Rich | Rich |
|  | Smell of heat sterilization |  | None | None |
|  | Coarse taste |  | None | None |

Example 9

Green tea leaves (100 g) were filled in an extraction column of 7 cm inner diameter and 40 cm height, and pre-processing of the tea leaves was carried out by recirculating cold water of 0° C. (1,500 mL) by a pump at 500 mL per minute for 10 minutes. Subsequent to removal of the recirculated solution, the extraction was carried out by recirculating warm water of 70° C. (1,500 mL) at 500 mL per minute for 20 minutes. After the extraction, an extract (1,357 mL) was recovered and then promptly chilled with ice water to give a polyphenol solution. The concentration of catechins in the polyphenol solution was 474 mg/100 mL.

Oolong tea leaves (blend of different varieties) (100 g) were added to warm water of 90° C. (3,000 mL), and extraction was carried out for 5 minutes while stirring. The extract was chilled with ice water, and filtrated through two sheets of No. 2 filter paper. An extract (2,631 g) was obtained as an "oolong tea extract", in which the concentration of polyphenols as measured by the ferrous tartrate method was 285 mg/100 mL.

Deionized water (300 g) was added to the oolong tea extract (210 g), the polyphenol solution (212 g), β-cyclodextrin (2.88 g) and ascorbic acid (0.8 g), and the pH of the resultant mixture was adjusted to 6.2 with a 5% aqueous solution of sodium bicarbonate, and then, deionized water was added to give a total amount of 800 g. The resulting aqueous solution was filled in cans, followed by heat sterilization at 121° C. for 20 minutes to obtain a beverage of Example 9. The concentration of catechins in the beverage was 144 mg/100 mL.

Example 10

In accordance with Table 4, a polyphenol solution was obtained in a similar manner as in Example 9.

Black tea leaves (Darjeeling) (100 g) were added to warm water of 60° C. (3,000 mL), and extraction was carried out for 3 minutes while stirring. The extract was chilled with ice water, and filtrated through two sheets of No. 2 filter paper. An extract (2,629 g) was obtained as a "black tea extract", in which the concentration of polyphenols was 145 mg/100 mL.

Deionized water (300 g) was added to the black tea extract (210 g), the polyphenol solution (236 g), β-cyclodextrin (2.88 g) and ascorbic acid (0.8 g), and the pH of the resultant mixture was adjusted to 6.2 with a 5% aqueous solution of sodium bicarbonate, and then, deionized water was added to give a total amount of 800 g. The resulting aqueous solution was filled in cans, followed by the heat sterilization at 121° C. for 20 minutes to obtain a beverage of Example 10. The concentration of catechins in the beverage was 142 mg/100 mL.

Example 11

In accordance with Table 4, a black tea beverage was obtained in a similar manner as in Example 10. The concentration of catechins in the beverage was 133 mg/100 mL.

Comparative Examples 10, 11 & 12

In a similar manner as in Example 9, oolong tea beverages were prepared in accordance with Table 4 to obtain the beverages of Comparative Examples 10, 11 and 12. The concentrations of catechins in the beverages were 139 mg/100 mL, 134 mg/100 mL and 139 mg/100 mL, respectively.

Comparative Examples 13 & 14

In a similar manner as in Example 10, black tea beverages were prepared in accordance with Table 4 to obtain the beverages of Comparative Examples 13 and 14. The concentrations of catechins in the beverages were 133 mg/100 mL and 148 mg/100 mL, respectively.

Organoleptic Evaluation

Evaluation of the beverages of the present invention (Examples 9, 10 and 11) and the comparative beverages (Comparative Examples 10, 11, 12, 13 and 14) was performed by three panelists expert on flavors and tastes. Evaluation criteria included the aroma of the beverage base, the strength of a smell of heat sterilization, the strength of a coarse taste and the strength of bitterness. The results of evaluation are presented in Table 4.

The beverage of Example 9 was rich in the aroma of oolong tea and had an adequate level of bitterness. The taste of green tea was not recognized, and the beverage had a clear taste. The beverages of Examples 10 and 11 were rich in the aroma of black tea and had an adequate level of bitterness. The taste of green tea was not recognized, and the beverages had a clear taste.

The beverage of Comparative Example 10 was deprived of the aroma of oolong tea, and a smell of heat sterilization was recognized. It has a strong bitterness, and a coarse taste derived from other than oolong tea was distinctly recognized. Concerning the beverage of Comparative Example 11, the release of the aroma of oolong tea was deteriorated a little, and a coarse taste derived from other than oolong tea was recognized although the level of bitterness was adequate. As to the beverage of Comparative Example 12, the release of the aroma of oolong tea was deteriorated, bitterness was strong, and a coarse taste derived from other than oolong tea was recognized distinctly. With respect to the beverage of Comparative Example 13, the release of the aroma of black tea was weak, and bitterness associated with a tang, which had been derived from the green tea, was also felt in an aftertaste. Concerning the beverage of Comparative Example 14, a strong unpleasant smell was recognized, and strong bitterness and a coarse taste remained after drinking.

TABLE 4

|  |  | Ex. 9 | Ex. 10 | Ex. 11 | Comp. Ex. 10 | Comp. Ex. 11 | Comp. Ex. 12 | Comp. Ex. 13 | Comp. Ex. 14 |
|---|---|---|---|---|---|---|---|---|---|
|  | Tea leaves (g) | 100 | 100 | 100 | 100 | 100 | 100 | 100 | 100 |
| Pre- | Deionized water (g) | 1500 | 1500 | 1500 | 1500 | 1500 | 1500 | 1500 | 1500 |
| processing | Temperature (° C.) | 0 | 5 | 8 | 70 | 15 | 40 | 70 | 70 |
|  | Extraction time (min) | 10 | 10 | 10 | 10 | 10 | 10 | 5 | 10 |

TABLE 4-continued

|  |  | Ex. 9 | Ex. 10 | Ex. 11 | Comp. Ex. 10 | Comp. Ex. 11 | Comp. Ex. 12 | Comp. Ex. 13 | Comp. Ex. 14 |
|---|---|---|---|---|---|---|---|---|---|
| Extraction | Recovered amount (g) | 1301 | 1282 | 1279 | 1188 | 1259 | 1204 | 1191 | 1183 |
|  | Conc. of catechins (wt. %) | 0.108 | 0.128 | 0.149 | 0.561 | 0.188 | 0.339 | 0.396 | 0.505 |
|  | Gallates percentage (%) | 29 | 30 | 31 | 52 | 33 | 42 | 50 | 51 |
|  | Deionized water (g) | 1500 | 1500 | 1500 |  | 1500 | 1500 | 1500 |  |
|  | Temperature (° C.) | 70 | 85 | 95 |  | 85 | 85 | 95 |  |
|  | Extraction time (min) | 20 | 20 | 20 |  | 20 | 20 | 20 |  |
|  | Recovered amount (g) | 1357 | 1341 | 1339 |  | 1380 | 1420 | 1404 |  |
|  | Conc. of catechins (wt. %) | 0.474 | 0.514 | 0.543 |  | 0.484 | 0.390 | 0.403 |  |
|  | Gallates percentage (%) | 56 | 60 | 62.6 |  | 61.6 | 64 | 63 |  |
| Formulation | Green tea extract |  |  |  |  |  |  |  |  |
|  | Oolong tea extract (g) | 210.4 |  |  | 210.4 | 210.4 | 210.4 |  |  |
|  | Black tea extract (g) |  | 210.4 | 210.4 |  |  |  | 210.4 | 210.4 |
|  | Polyphenol solution (g) | 212 | 236 | 214.4 | 178.4 | 201.6 | 244 | 300 |  |
|  | Catechin preparation (g) |  |  |  |  |  |  |  | 3.68 |
|  | β-Cyclodextrin (g) | 2.88 | 2.88 | 2.88 | 2.88 | 2.88 | 2.88 | 2.88 | 2.88 |
|  | Conc. glucose soln. (75%) |  | 75.8 | 75.8 |  |  |  | 75.8 | 75.8 |
|  | Sodium ascorbate (g) | 0.8 | 0.8 | 0.8 | 0.8 | 0.8 | 0.8 | 0.8 | 0.8 |
|  | 5% Na bicarbonate soln. (g) | q.s. | q.s. | q.s. | q.s. | q.s. | q.s. | q.s. | q.s. |
|  | Deionized water | Balance | Balance | Balance | Balance | Balance | Balance | Balance | Balance |
|  | Total amount (g) | 800 | 800 | 800 | 800 | 800 | 800 | 800 | 800 |
|  | Total catechin conc. | 144 | 142 | 133 | 139 | 134 | 139 | 133 | 148 |
|  | Gallates percentage (%) | 53.5 | 56.9 | 59.8 | 49.4 | 57.3 | 59.0 | 60.2 | 49.9 |
| Evaluation | Aroma | Good | Good | Good | Lost | Weak | Weak | Weak | Unpleasant |
|  | Smell of heat sterilization | None | None | None | Strong | None | None | None | Strong |
|  | Coarse taste | None | None | None | Strong | Rel. strong | Strong | Strong | Strong |
|  | Bitterness | Adequate | Adequate | Adequate | Strong | Adequate | Strong | Strong | Strong |

Example 12

Green tea leaves (100 g) were filled in an extraction column of 7 cm inner diameter and 40 cm height, and the extraction was carried out by recirculating cold water of 0° C. (1,500 mL) by a pump at 500 mL per minute for 10 minutes. After the extraction, an extract (1,301 mL) was recovered as an "extract 1", in which the concentration of catechins was 108 mg/100 mL.

Then, warm water of 70° C. (1,500 mL) was recirculated at 500 mL per minute for 20 minutes for another extraction, after which the extract (1,357 mL) was recovered and then promptly chilled with ice water. The resulting extract is obtained as an "extract 2", in which the concentration of catechins was 474 mg/100 mL.

Deionized water (350 g) was added to the extract 1 (194 g), the extract 2 (194 g), β-cyclodextrin (2.88 g) and ascorbic acid (0.8 g), and the pH of the resultant mixture was adjusted to 6.2 with a 5% aqueous solution of sodium bicarbonate, and then, deionized water was added to give a total amount of 800 g. The resulting solution was filled in cans, followed by heat sterilization at 121° C. for 20 minutes to obtain a beverage of Example 12. The concentration of catechins in the beverage was 124 mg/100 mL.

Examples 13 & 14

In accordance with Table 5, beverages of Examples 13 and 14 were obtained in a similar manner as in Example 12.

Comparative Example 15

An extract 1 was obtained in accordance with Table 5. A solution was prepared following the formulation described in Example 12 using the extract 1. The resulting solution was filled in cans and then sterilized to obtain a beverage of Comparative Example 15.

Comparative Examples 16, 17 & 18

Extracts 1 and 2 were obtained in accordance with Table 5. The extract 1 was discarded. Solutions were prepared in accordance with Table 5, following the formulation described in Example 12 using the extract 2. The resulting aqueous solutions were separately filled in cans and then sterilized to obtain beverages of Comparative Examples 16, 17 and 18.

Comparative Example 19

Extracts 1 and 2 were obtained in accordance with Table 5. Also following Table 5, a beverage of Comparative Example 19 was obtained in a similar manner as in Example 12.

Comparative Example 20

An extract 1 was obtained in accordance with Table 5. A solution was prepared following the formulation described in Example 12 using the extract 1 and a commercial catechin preparation (content of catechins in solids: 34%). The resulting aqueous solution was filled in cans and then sterilized to obtain a beverage of Comparative Example 20.

Organoleptic Evaluation

Evaluation of the beverages of the present invention (Examples 12, 13 and 14) and the comparative beverages (Comparative Examples 15, 16, 17, 18, 19 and 20) was performed by three panelists expert on flavors and tastes. Evaluation criteria included the strength of a smell of heat sterilization, the strength of astringency remaining after drinking, the strength of bitterness, and the strength of a coarse taste, and the results of evaluation are presented in Table 5.

Concerning the beverages of Examples 12, 13 and 14, a fresh taste of tea was recognized, a coarse taste was slight, the production of an unpleasant smell caused by heat sterilization was not much, and bitterness was adequate. Astringency remaining on a tongue after drinking was very weak. With regard to the beverage of Comparative Example 15, a fresh taste of green tea was lost, and the production of a coarse taste and a smell of heat sterilization were recognized. Astringency remaining after drinking was distinct.

As to the beverages of Comparative Examples 16, 17 and 18, an original taste was lost and a coarse taste became stronger in proportion to a rise in the extraction temperature of the extract 1. The production of a smell of heat sterilization was not much, but as the extraction temperature of the extract 1 became higher, an increase in bitterness was recognized and an increase in astringency was also distinct after drinking. With respect to the beverage of Comparative Example 19, the production of a smell of heat sterilization was not much, and bitterness was adequate. However, the production of a coarse taste and astringency remaining after drinking were recognized. Concerning the beverage of Comparative Example 20, an unpleasant smell was recognized as well as a smell of heat sterilization. Bitterness was adequate, but astringency and a coarse taste remaining afterward were clearly recognized.

The invention claimed is:

1. A production process of a beverage comprising a dried green tea polyphenol, said process comprising:
    subjecting green tea leaves to a first extraction with water having a temperature of −5° C. to 8° C.,
    separating and removing a first extraction solution obtained by the first extraction,
    subjecting residual green tea leaves from the first extraction to a second extraction with warm water of 50° C. or higher,
    drying a second extraction solution obtained from the second extraction to obtain the dried green tea polyphenol, and
    mixing the dried green tea polyphenol with a beverage to produce the beverage comprising a dried green tea polyphenol,
    with the proviso that the beverage comprising a dried green tea polyphenol does not comprise the first extraction solution or an extract of the first extraction solution.

TABLE 5

| | | Ex. 12 | Ex. 13 | Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
| Extract 1 | Tea leaves (g) | 100 | 100 | 100 | 100 | 100 | 100 | 100 | 100 | 100 |
| | Deionized water (g) | 1500 | 1500 | 1500 | 1500 | 1500 | 1500 | 1500 | 1500 | 1500 |
| | Temperature (° C.) | 0 | 5 | 8 | 70 | 15 | 40 | 70 | 15 | 70 |
| | Extraction time (min) | 10 | 10 | 10 | 10 | 10 | 10 | 5 | 10 | 10 |
| | Recovered amount (g) | 1301 | 1282 | 1279 | 1188 | 1259 | 1204 | 1191 | 1259 | 1183 |
| | Conc. of catechins (wt. %) | 0.108 | 0.128 | 0.149 | 0.561 | 0.188 | 0.339 | 0.396 | 0.188 | 0.505 |
| | Gallates percentage (%) | 29 | 30 | 31 | 52 | 33 | 42 | 50 | 33 | 51 |
| Extract 2 | Deionized water (g) | 1500 | 1500 | 1500 | | 1500 | 1500 | 1500 | 1500 | |
| | Temperature (° C.) | 70 | 85 | 95 | | 85 | 85 | 95 | 85 | |
| | Extraction time (min) | 20 | 20 | 20 | | 20 | 20 | 20 | 20 | |
| | Recovered amount (g) | 1357 | 1341 | 1339 | | 1380 | 1420 | 1404 | 1380 | |
| | Conc. of catechins (wt. %) | 0.474 | 0.514 | 0.543 | | 0.484 | 0.390 | 0.403 | 0.484 | |
| | Gallates percentage (%) | 56 | 60 | 62.6 | | 61.6 | 64 | 63 | 61.6 | |
| Formulation | Extract 1 (g) | 194 | 196 | 178 | 233.6 | | | | 787 | 94.6 |
| | Extract 2 (g) | 194 | 196 | 178 | | 264 | 320 | 312 | 187 | |
| | Comm. catechin prep'n (g) | | | | | | | | | 2.4 |
| | β-Cyclodextrin (g) | 2.88 | 2.88 | 2.88 | 2.88 | 2.88 | 2.88 | 2.88 | 2.88 | 2.88 |
| | Sodium ascarbate (g) | 0.8 | 0.8 | 0.8 | 0.8 | 0.8 | 0.8 | 0.8 | 0.8 | 0.8 |
| | 5% Na bicarbonate soln. (g) | q.s. | q.s. | q.s. | q.s. | q.s. | q.s. | q.s. | q.s. | q.s. |
| | Deionized water | Balance | Balance | Balance | Balance | Balance | Balance | Balance | Balance | Balance |
| | Total amount (g) | 800 | 800 | 800 | 800 | 800 | 800 | 800 | 800 | 800 |
| | Total catechin conc(wt. %) | 0.124 | 0.142 | 0.139 | 0.141 | 0.145 | 0.141 | 0.138 | 0.142 | 0.151 |
| | Gallates percentage (%) | 48.8 | 51.7 | 53.4 | 50 | 59 | 61.4 | 60.6 | 53.6 | 49.1 |
| Evaluation | Smell of heat sterilizat'n | Weak | Weak | Weak | Strong | Weak | Weak | Weak | Weak | Strong |
| | Bitterness | Adequate | Adequate | Adequate | Rel. strong | Rel. strong | Strong | Strong | Adequate | Adequate |
| | Aftertaste | Weak | Weak | Weak | Strong | Rel. strong | Rel. strong | Strong | Rel. strong | Strong |
| | Coarse taste | Weak | Weak | Weak | Strong | Rel. strong | Strong | Strong | Rel. strong | Strong |

According to the process of the present invention, a green tea flavor having a good refined taste specific to green tea can be obtained. The use of this green tea flavor makes it possible to obtain a green-tea-based beverage which is free of any unpleasant sterilization smell and which is reduced in bitterness and coarse taste. Further, the present invention also provides a green tea polyphenol abundantly containing catechins and enabling to retain the original flavor of a beverage to which the green tea polyphenol is added. A beverage with the green tea polyphenol added therein retains the flavor of the beverage used as the base, is free of any unpleasant smell which would otherwise be produced after heat sterilization, and is reduced in coarse taste and bitterness.

2. The production process according to claim 1, wherein from 45 to 65 wt. % of non-polymer catechins of the dried green tea polyphenol consist of gallate esters of catechins.

3. The production process according to claim 1, wherein the drying is freeze drying.

4. A beverage comprising a dried green tea polyphenol obtained by the process according to claim 1.

5. A semi-fermented tea beverage or fermented tea beverage comprising a dried green tea polyphenol obtained by the process according to claim 1.

6. A beverage comprising:
    (A) a polyphenol solution obtained by a first extraction of green tea leaves with water having a temperature of −5°

C. to 8° C., and then a second extraction of residual green tea leaves from the first extraction with warm water of 50° C. or higher, and (B) a semi-fermented tea extract or fermented tea extract, with the proviso that the beverage does not comprise a first extract solution obtained by the first extraction or an extract of the first extraction solution.

7. The beverage according to claim 6, which contains from 0.092 to 0.5 wt. % of non-polymer catechins.

8. The beverage according to claim 7, wherein from 45 to 65 wt. % of the non-polymer catechins consist of gallate esters of catechins.

9. The beverage according to claim 6, wherein the semi-fermented tea extract or fermented tea extract is oolong tea or black tea.

10. A beverage comprising a dried green tea polyphenol obtained by the process according to claim 2.

11. A beverage comprising a dried green tea polyphenol obtained by the process according to claim 3.

12. A semi-fermented tea beverage or fermented tea beverage comprising a dried green tea polyphenol obtained by the process according to claim 2.

13. A semi-fermented tea beverage or fermented tea beverage comprising a dried green tea polyphenol obtained by the process according to claim 3.

14. The beverage according to claim 7, wherein the semi-fermented tea extract or fermented tea extract is oolong tea or black tea.

15. The beverage according to claim 8, wherein the semi-fermented tea extract or fermented tea extract is oolong tea or black tea.

* * * * *